US012502322B2

(12) United States Patent
Newkirk et al.

(10) Patent No.: US 12,502,322 B2
(45) Date of Patent: Dec. 23, 2025

(54) PATIENT SUPPORT APPARATUS WITH A HYDRAULIC LIFT HAVING POWERED AND MANUAL MODES

(71) Applicant: HILL-ROM SERVICES, INC., Batesville, IN (US)

(72) Inventors: David C. Newkirk, Batesville, IN (US); Brian Guthrie, Batesville, IN (US); Jeff S. Jelinek, Batesville, IN (US); Dennis P. Laloge, Batesville, IN (US); Frank E. Sauser, Batesville, IN (US); Jonathan D. Turner, Batesville, IN (US)

(73) Assignee: HILL-ROM SERVICES, INC., Batesville, IN (US)

( * ) Notice: Subject to any disclaimer, the term of this patent is extended or adjusted under 35 U.S.C. 154(b) by 591 days.

(21) Appl. No.: 17/960,549

(22) Filed: Oct. 5, 2022

(65) Prior Publication Data

US 2023/0107717 A1 Apr. 6, 2023

Related U.S. Application Data

(60) Provisional application No. 63/252,853, filed on Oct. 6, 2021.

(51) Int. Cl.

*A61G 7/018* (2006.01)
*A61G 7/015* (2006.01)
*A61G 7/075* (2006.01)

(52) U.S. Cl.

CPC ............. *A61G 7/018* (2013.01); *A61G 7/015* (2013.01); *A61G 7/0755* (2013.01)

(58) Field of Classification Search

CPC ................................ A61G 7/015; A61G 7/018
See application file for complete search history.

(56) References Cited

U.S. PATENT DOCUMENTS 2,297,105 A * 9/1942 Laukhuff ............... A61G 7/015 5/618
3,304,116 A * 2/1967 Stryker .................... A61G 7/00 5/81.1 R (Continued)

FOREIGN PATENT DOCUMENTS

AT 377912 B 5/1985
CA 2471005 A1 * 12/2005

(Continued)

OTHER PUBLICATIONS

International Search Report and Written Opinion in corresponding International Application PCT/US2022/077612, Jan. 6, 2023, 11 pages.

*Primary Examiner* — Eric J Kurilla
(74) *Attorney, Agent, or Firm* — Barnes & Thornburg LLP

(57) ABSTRACT

A modular patient support apparatus includes linkages which provide advanced kinematics for moving portions of the patient support apparatus. The patient support apparatus includes a cantilevered lift system supporting an upper frame, the cantilevered lift system including a linkage configured to raise the upper frame in a substantially vertical direction, a telescopic cylinder engaged with the linkage, the telescopic extension and retraction of the cylinder causing the linkage to move, and a lift assist assembly, the lift assist assembly being loaded as the cantilevered lift system is lowered to impart a force on the linkage to reduce the load on the telescopic cylinder. The lift system includes an actuation system that operates manually or with power.

25 Claims, 11 Drawing Sheets

(56) References Cited

U.S. PATENT DOCUMENTS

| | | | | |
|---|---|---|---|---|
| 3,958,283 | A * | 5/1976 | Adams | A61G 7/002 5/616 |
| 4,038,709 | A | 8/1977 | Kerwit | |
| 4,559,656 | A | 12/1985 | Foster | |
| 4,691,393 | A | 9/1987 | Kuck | |
| 4,751,754 | A | 6/1988 | Bailey et al. | |
| 5,054,141 | A | 10/1991 | Foster et al. | |
| 5,063,624 | A | 11/1991 | Smith et al. | |
| 5,802,638 | A | 9/1998 | Parker et al. | |
| 5,940,911 | A * | 8/1999 | Wang | A47C 19/045 5/147 |
| 5,996,151 | A * | 12/1999 | Bartow | A61G 7/015 5/613 |
| 6,000,076 | A * | 12/1999 | Webster | A61G 7/05 5/616 |
| 6,089,593 | A * | 7/2000 | Hanson | A61G 7/0528 297/85 L |
| 6,163,903 | A | 12/2000 | Ulrich et al. | |
| 6,230,343 | B1 * | 5/2001 | Buiskool | A61G 7/012 5/610 |
| 6,352,240 | B1 | 3/2002 | Eckstein et al. | |
| 6,726,279 | B1 | 4/2004 | Figel et al. | |
| 6,749,034 | B2 * | 6/2004 | Vogel | A61G 7/0528 180/9.54 |
| 8,176,584 | B2 * | 5/2012 | Hornbach | A61G 7/0509 5/601 |
| 8,413,274 | B2 | 4/2013 | Ulrich et al. | |
| 8,739,329 | B2 | 6/2014 | Koorey | |
| 9,027,183 | B2 | 5/2015 | Childs et al. | |
| 9,126,571 | B2 | 9/2015 | Emire et al. | |
| 9,815,439 | B2 | 11/2017 | Lemire et al. | |
| 9,833,368 | B2 * | 12/2017 | Turner | A61G 7/0509 |
| 10,226,134 | B2 | 3/2019 | Brykalski et al. | |
| 10,517,784 | B2 | 12/2019 | Zerhusen et al. | |
| 10,869,791 | B2 | 12/2020 | Matheny et al. | |
| 11,786,042 | B2 * | 10/2023 | Goldsmith | A47C 20/041 5/611 |
| 2002/0066325 | A1 * | 6/2002 | Roither | H02K 7/1166 74/425 |
| 2009/0094748 | A1 * | 4/2009 | Long | A47C 20/041 5/613 |
| 2011/0272200 | A1 * | 11/2011 | Clapp | A61G 7/018 297/118 |
| 2014/0259410 | A1 | 9/2014 | Zerhusen | |
| 2016/0058639 | A1 * | 3/2016 | Lacasse | A61G 7/018 5/618 |
| 2017/0246065 | A1 | 8/2017 | Connell et al. | |

FOREIGN PATENT DOCUMENTS

| | | | | |
|---|---|---|---|---|
| DE | 202006019434 | U1 | 4/2007 | |
| EP | 2308439 | A1 * | 4/2011 | A61G 7/002 |
| EP | 2777672 | A1 * | 9/2014 | A61G 7/012 |
| WO | 2017059830 | A1 | 4/2017 | |

* cited by examiner

PATIENT SUPPORT APPARATUS WITH A HYDRAULIC LIFT HAVING POWERED AND MANUAL MODES

CROSS-REFERENCE TO RELATED APPLICATIONS

This application claims priority under 35 U.S.C. § 119(e) to U.S. Provisional Application No. 63/252,853, filed Oct. 6, 2021, which is expressly incorporated by reference herein.

BACKGROUND

The present disclosure is related to a modular patient support apparatus that is adaptable to various levels of acuity to provide support a patient in a particular level of acuity. More specifically, the present disclosure is related to a patient support apparatus that has an articulation structure that is adaptable to provide both manual and powered modes.

In the modern healthcare facility, patients are often kept for extended periods in the emergency unit or an observation ward while test are run and the patient is under observation. Due to cost constraints, patients are not administratively admitted until it is determined that their acuity level qualifies for reimbursement for treatment as an in-patient. As such, the patient may spend an extended period in a space that is not a typical hospital room. From this location, the patient may be transported to other portions of the facility for diagnostic testing.

In some instances, the patient may be in significant discomfort, lack mobility, or be otherwise incapacitated. As such, there may be a need to move the patient to other areas in the facility without transferring the patient to another patient support apparatus or transport device. The need to provide an appropriate patient support apparatus, such as a hospital bed, or stretcher, based on the patient's acuity level drives the appropriate environment for the patient. However, early in the admissions process or in extended observation, functionality of both a hospital bed and a stretcher may be needed.

Being able to choose the appropriate patient support apparatus for the expected stay of the patient, at the time the patient presents, limits the opportunity for a patient to soil multiple patient support apparatuses. When a patient is removed from a patient support apparatus, the patient support apparatus must be cleaned before being used again for another patient. Thus, it is helpful for the patient to be appropriately placed. However, having various patient support apparatuses adapted for various acuities may create challenges for caregivers as the operation of each must be understood.

Thus, there is a need for a patient support apparatus structure that has common elements for basic operation, but that is modular such that features may be included while maintaining a basic operation familiar to the caregivers.

SUMMARY

The present disclosure includes one or more of the features recited in the appended claims and/or the following features which, alone or in any combination, may comprise patentable subject matter.

According to a first aspect of the present disclosure, a patient support apparatus includes an upper frame, a cantilevered lift system, and a drive assembly. The cantilevered lift system supports the upper frame and includes a linkage configured to raise the upper frame in a substantially vertical direction. The cantilevered lift system includes a telescopic cylinder engaged with the linkage, the telescopic extension and retraction of the cylinder causing the linkage to move. The cantilevered lift system includes a lift assist assembly, the lift assist assembly being loaded as the cantilevered lift system is lowered to impart a force on the linkage to reduce the load on the telescopic cylinder. The drive assembly is operable to extend and retract the telescopic cylinder. The drive assembly includes a manual module configured to allow a user to provide a manual input to the drive assembly to extend the telescopic cylinder and a powered module, the powered module removably coupleable to the manual module to allow the powered module to be added to the drive assembly to allow for powered extension of the telescopic cylinder.

In some embodiments, the lift assist assembly acts in parallel to the telescopic cylinder.

In some embodiments, the lift assist assembly comprises a compression spring.

In some embodiments, the lift assist assembly comprises a gas spring.

In some embodiments, the lift assist assembly comprises a torsion spring.

In some embodiments, the telescopic cylinder is a hydraulic cylinder.

In some embodiments, the manual input is a foot pedal.

In some embodiments, the powered module comprises a motor and a pump driven by the motor.

In some embodiments, the patient support apparatus further includes a user interface and wherein the operation of the powered module is controlled by the user interface.

In some embodiments, the linkage comprises a parallelogram linkage.

In some embodiments, a free end of the cantilevered lift system is lower than the fixed end when the cantilevered lift system is in its lowest position.

According to a second aspect of the present disclosure, a patient support apparatus includes an upper frame, a thigh deck section pivotably coupled to the upper frame at a first pivot, a foot deck section pivotably coupled to the thigh section at a second pivot, the foot section having a free end, and an actuator operable to move the thigh deck section and the foot deck section simultaneously, wherein movement of the actuator causes the second pivot to rise vertically and the free end of the foot deck section to lower.

In some embodiments, the actuator is pivotably coupled to the upper frame.

In some embodiments, the actuator drives a foot link coupled to the foot deck section and a thigh link coupled to the thigh deck section.

In some embodiments, the foot link and the thigh link are interconnected by a swing link and the actuator acts on the swing link.

In some embodiments, the swing link is kinematically constrained such that it pivots about an imaginary axis.

In some embodiments, the thigh link is pivotably coupled to the thigh deck section and the foot link is pivotably coupled to the foot deck section.

In some embodiments, the foot link is pivotably coupled to the swing link and the thigh link is pivotably coupled to the swing link.

In some embodiments, the actuator is pivotably coupled to the swing link.

In some embodiments, retraction of the actuator causes the second pivot to raise and the free end of the foot deck section to lower.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
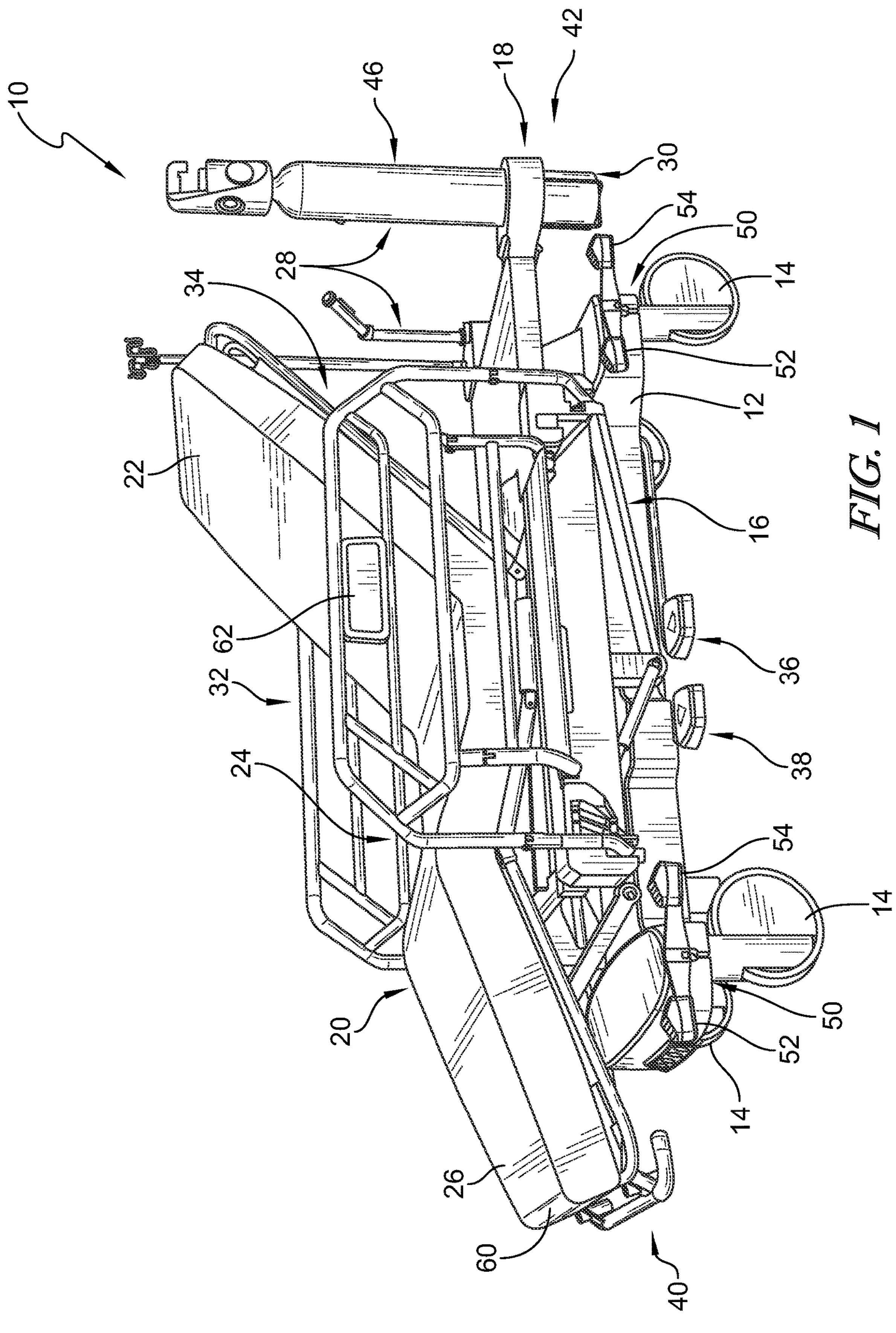
FIG. 1 is a perspective view of a first embodiment of a patient support apparatus according to the present disclosure.

According to the present disclosure, a patient support apparatus 10 shown in FIG. 1 is configurable to provide care to patients of varying acuity, while also providing improved mobility as a patient is moved between areas of a care facility, such as a hospital, for example. The patient support apparatus 10 includes a base 12 supported on four casters 14 which are lockable to prevent movement of the patient support apparatus 10 over the floor, but are oversized to provide smooth movement over the floor when released. The base 12 supports a lift assembly 16 which provides cantilevered support of an upper frame 18 and moves the upper frame 18 vertically, when the lift assembly 16 is activated.

The upper frame 18 supports a deck 20. The deck 20 has multiple sections and has panels which are constructed of radiolucent material so that a C-arm x-ray device or other similar imaging device may be used with the deck 20. The deck 20 has a pivoting head deck section 22 that pivots relative to the upper frame 18. A thigh deck section 24 is also pivotable relative to the upper frame 18. A foot deck section 26 is supported from the upper frame 18 and pivotable relative to the thigh deck section 24. As will be described in more detail below, the foot deck section 26 is configured to move to a dependent position wherein the foot end 40 of the foot deck section 26 drops below the upper frame 18 so that the deck 20 may form a chair-like arrangement for patient comfort and optimal positioning. In the embodiment of FIG. 1, the patient support apparatus 10 the articulation of the foot deck section 26 and thigh deck section 24 is accomplished manually. The same is true of the head deck section 22. The articulation may be assisted by a releasable gas spring which provides some force to assist in movement of the sections when they are being manually manipulated.

Figure 3:
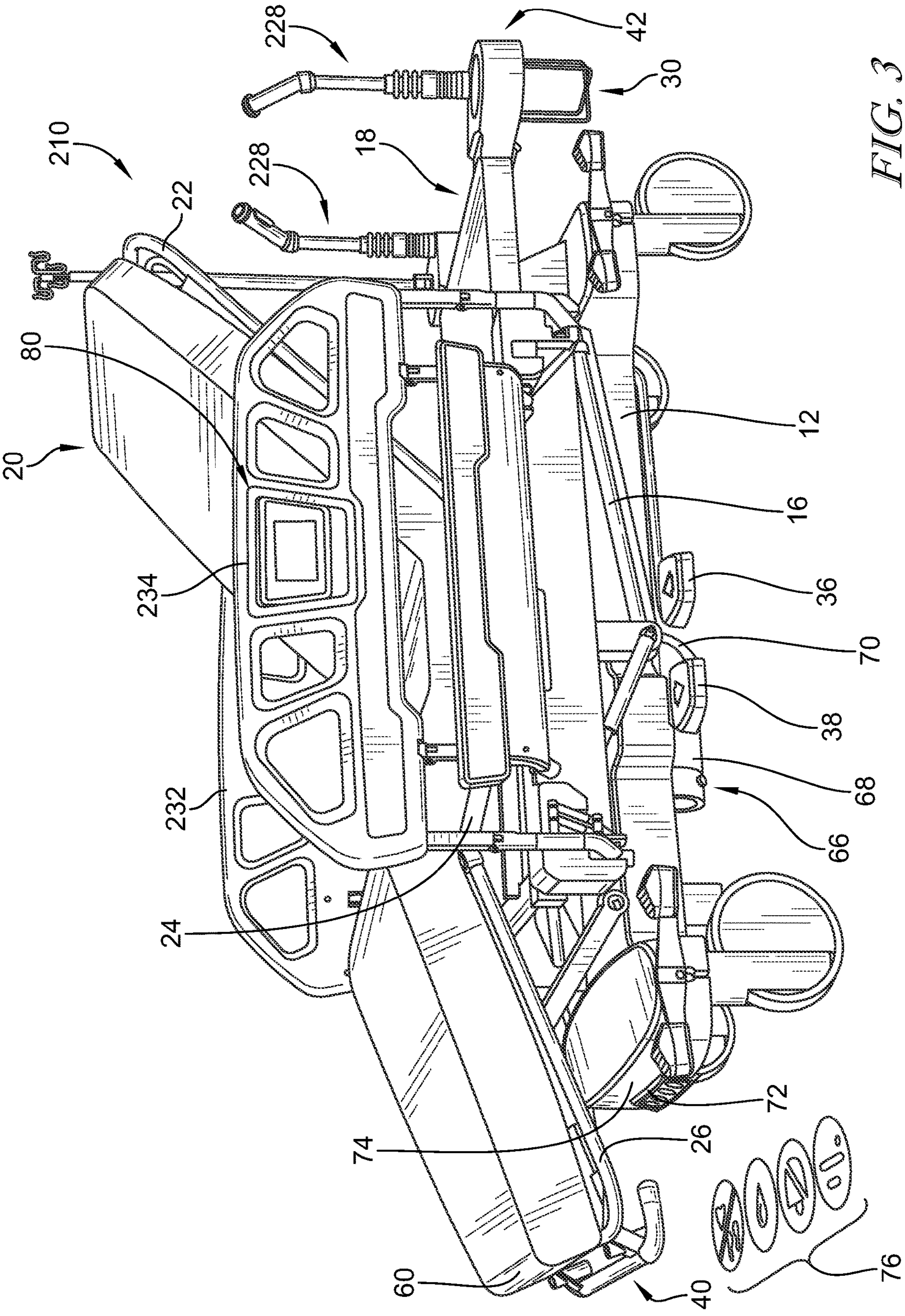
FIG. 3 is a perspective view of a third embodiment of a patient support apparatus according to the present disclosure.

To assist with the mobility of the patient support apparatus 10, push handles 28 are positioned at a head end 42 of the patient support apparatus 10. The push handles 28 in the embodiment of FIG. 1 are fixed to the upper frame 18 and the height of the push handles 28 is adjusted by adjusting the height of the upper frame 18 using the lift assembly 16. The patient support apparatus 10 also includes an oxygen take holder 30 that supports an oxygen tank 46 as shown in the embodiment of FIG. 3. The patient support apparatus 10 further includes a right side rail 32 and a left side rail 34. The orientation of the sides and ends of the patient support apparatus 10 is established by the orientation of a patient supported on the patient support apparatus 10 in a supine position such that the right side rail 32 is positioned to the patient's right and the left side rail 34 is positioned to the patient's left. Similarly, references to foot deck section 26 or foot end 40 related to the position of the patient's feet when in the supine position on the patient support apparatus 10. Likewise, head end 42 is oriented at the end of the patient support apparatus 10 where a patient's head would be in a supine position.

The lift assembly 16 is operated by a raise pedal 36 that may allow a user to manually activate the raise pedal 36 so that the lift assembly 16 is raised. In some embodiments, the raise pedal 36 may require multiple activations to move the lift assembly 16, but in other embodiments, the lift assembly 16 may be powered to actuate with a single activation of the raise pedal 36. A lower pedal 38 is actuable to cause the lift assembly 16 to lower, thereby lowering the upper frame 18.

The patient support apparatus 10 includes a brake/steer mechanism supported by the base frame 16. The brake/steer mechanism is of the type known in the art and able to transition the operation of the casters 14 between a full lock that prevents rotation of the wheels of the caster 14 and prevents swiveling of the caster 14 about a vertical axis, a neutral position in which the casters 14 are free to rotate and swivel, and a steer position in which one of the casters 14 is locked in swivel to serve as a tracking wheel to assist with steering of the patient support apparatus 10. In the present embodiment, the caster 14 positioned at the left foot end of the patient support apparatus 10 serves as the steer caster. In other embodiments, a different caster 14 may be placed in steer. The activation of the brake/steer mechanism is provided by a actuator 50 which is positioned at each caster 14, each actuator 50 having a brake pedal 52 and a steer pedal 54 as is known in the art. This allows a caregiver to actuate the brake/steer mechanism at multiple positions about the periphery of the patient support apparatus 10.

Notably, patient support apparatus 10 further includes a support cushion assembly or mattress 60 supported on the deck 20 a movable with the deck 20 to conform to the deck in multiple positions. Additionally, patient support apparatus 10 includes a user interface 62 that operates a scale system built into the patient support apparatus 10 as is known in the art.

Figure 2:
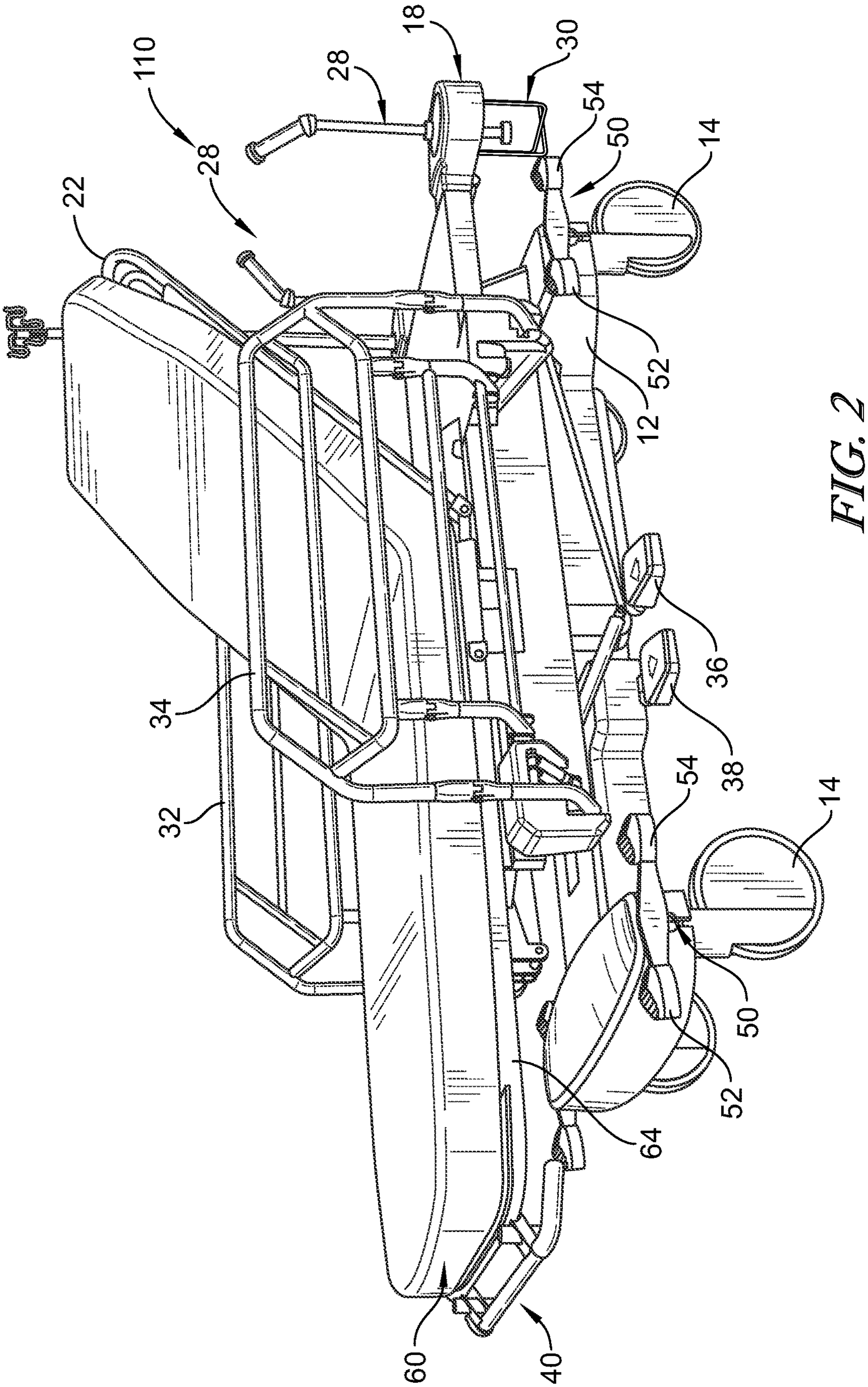
FIG. 2 is a perspective view of a second embodiment of a patient support apparatus according to the present disclosure.

FIG. 2 shows another embodiment of a patient support apparatus 110 that is similar to patient support apparatus 10, but lacks some additional features that are present in patient support apparatus 10 and illustrates the ability of the patient support apparatus 10 to be adapted and down-featured to a basic procedural patient support apparatus. For example, the patient support apparatus 110 lacks the scale system discussed above. In addition, the patient support apparatus 110 does not have a foot deck section 26 or thigh deck section 24, but the entire lower body of a patient is supported on a flat deck 64 that does not articulate relative to the upper frame 18.

FIG. 3 shows yet another embodiment of a patient support apparatus 210 that is up-featured from the patient support apparatus 10 to include additional features. Patient support apparatus 210 includes side rails 232 and 234 that present a different look and feel that is more appropriate for higher acuity environments. The push handles 228 of patient support apparatus 210 include force sensing load cells that are used to provide an input to power drive wheel assembly 66 (best seen in FIG. 5). The power drive wheel assembly 66 is of the type known in the art that includes a deploy motor (not shown) and a drive motor 68. When the brake/steer mechanism is placed in the steer configuration, a drive wheel 70 is deployed to engage the floor. Inputs from the push handles 228, 228 determine the speed the motor 68 drives the wheel 70 to assist a caregiver in moving the patient support apparatus 210 over the floor.

The patient support apparatus 210 also includes a status notification system similar to that disclosed in US20140259410A1, which is incorporated by reference herein for the disclosure of alert indicators. The patient support apparatus 210 includes a panel 72 that displays various conditions of the patient support apparatus 210 on a vertical surface 74 on the base 12. In addition, the patient support apparatus 210 is projects images 76 on the floor that are also indicative of the conditions of the patient support apparatus 210 or sensors on the patient support apparatus 210.

In addition, the patient support apparatus 210 includes a touchscreen user interface 80 mounted on the side rail 234. The interface 80 allows a caregiver to control various aspects of the patient support apparatus 210, including operation of the lift assembly 16 to raise and lower the upper frame 18, movement of the head deck section 22 between a lowered and raised position, or movement of the thigh deck section 24 and foot deck section 26. The interface 80 may operate other features that are not shown in the patient support apparatus 210, but which may be included. Such features include integration with an electronic medical records (EMR) system, operation of a scale system, operation of a clinical sensors integrated into the patient support apparatus 210, such as heart rate and respiration monitoring, operation of a patient position monitoring or bed exit system, or other system typically integrated into a patient support apparatus.

Figure 4:
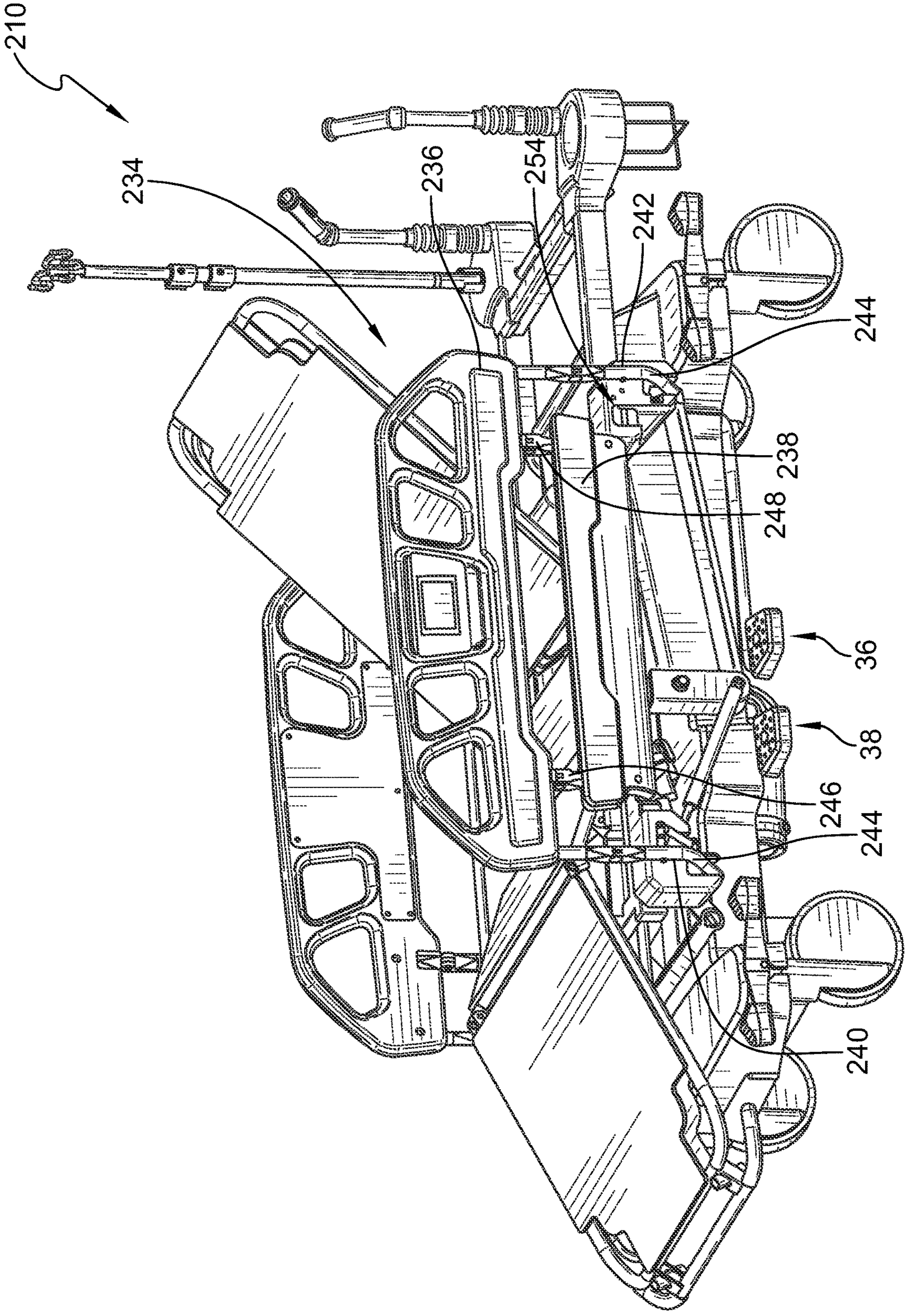
FIG. 4 is a perspective view of the embodiment of FIG. 3 with portions removed.
Figure 5:
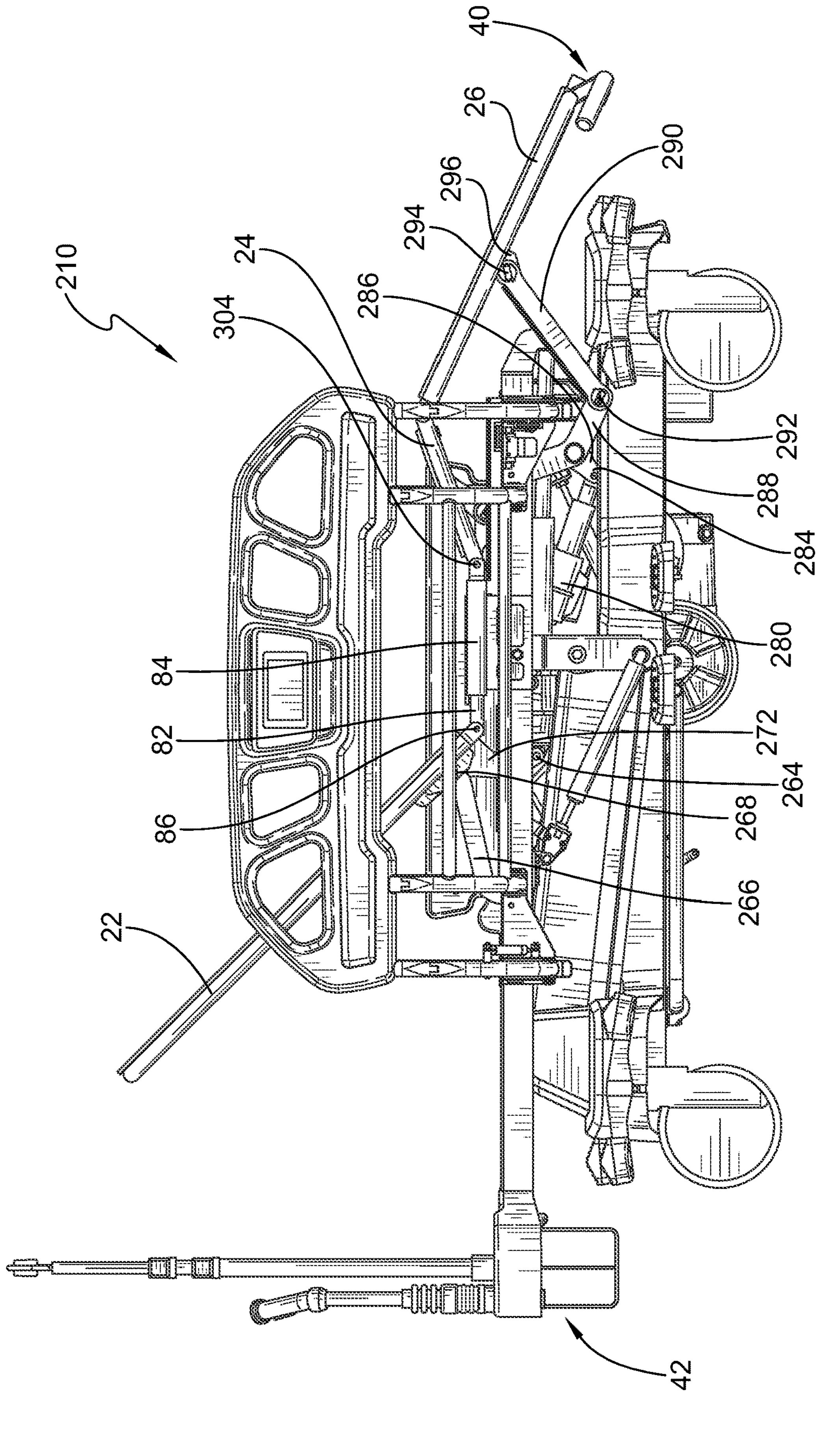
FIG. 5 is a right side view of the third embodiment of patient support apparatus with deck sections moved to a raised position.
Figure 6:
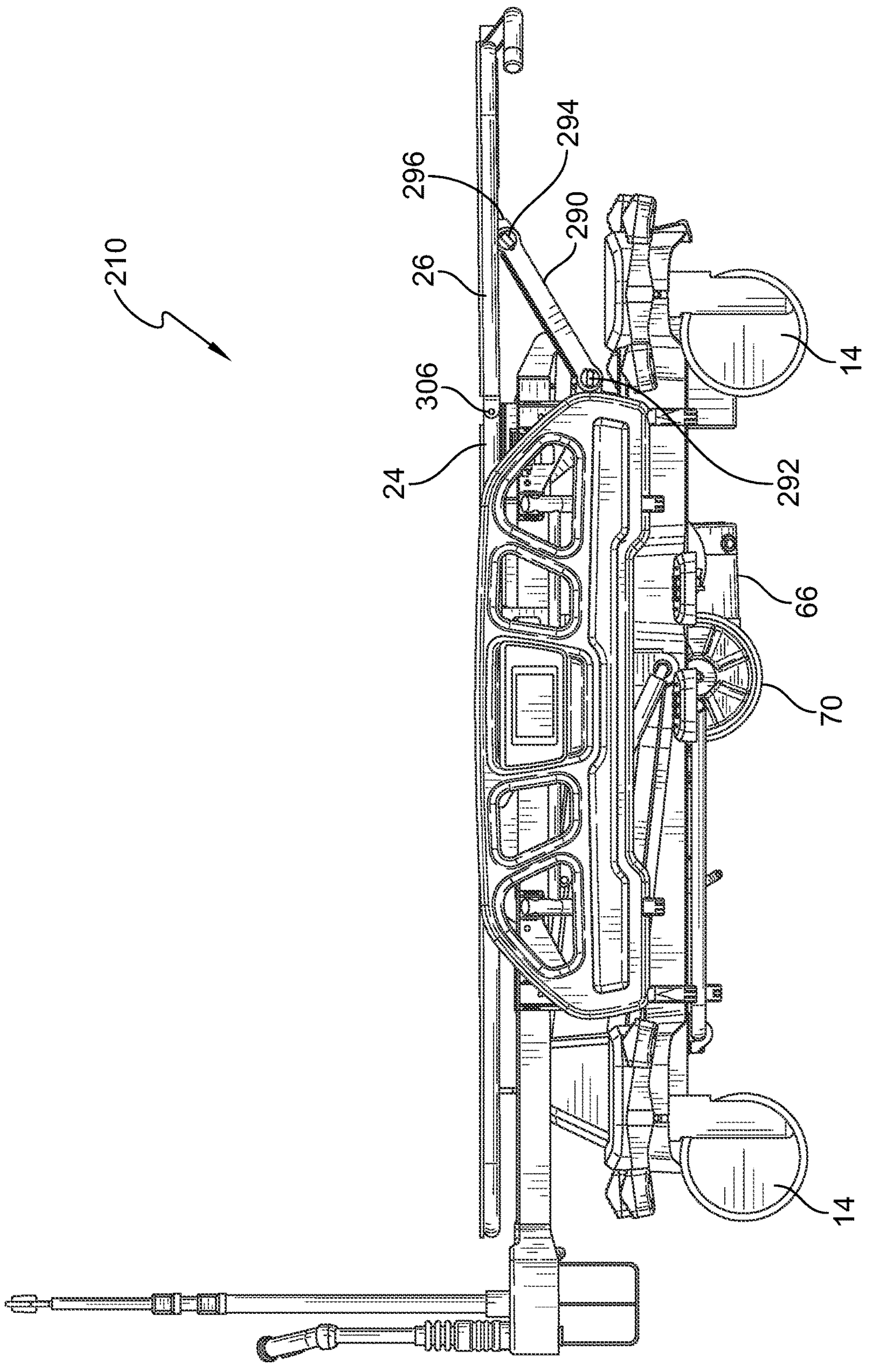
FIG. 6 is a view similar to FIG. 5 with the deck sections in a lowered position.
Figure 14:
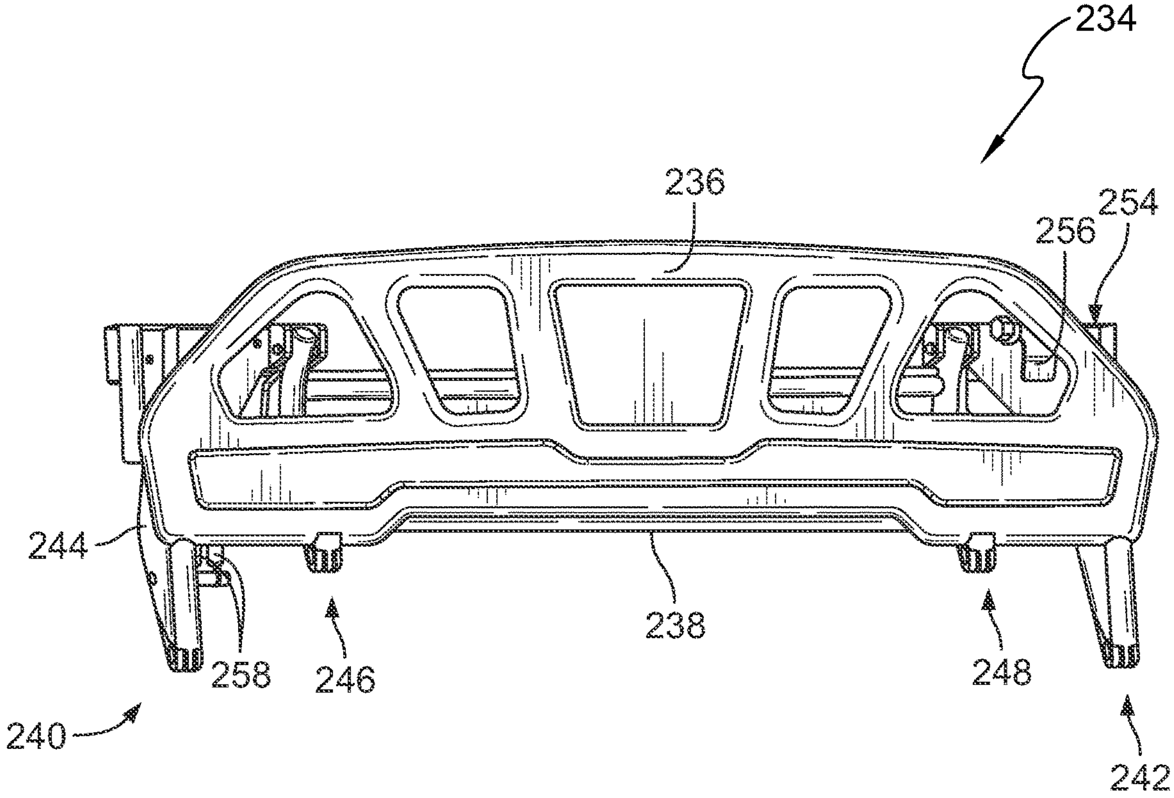
FIG. 14 is a view of the left side rail of FIG. 13 taken from a different perspective.

The side rails 232, 234 of patient support apparatus 210 are movable between the raised position shown in FIGS. 3-5 and a lowered position shown in FIG. 6. Referring to FIG. 4, the side rail 234 is shown to include an upper body 236 and a lower panel 238. The upper body 236 is supported on a pair of outboard supports 240 and 242. The panel 238 is secured to a pair of inboard supports 246 and 248 and moves with the outboard supports 240 and 242. Each of the supports 240, 242, 246, 248 includes a curved lower arm 244 arm that pivots about a respective pivot axis relative to the upper frame 18. In addition, each support 240, 242, 246, and 248 includes a latching pivot joint 250 that is locked into place in the raised position, but may be manually released by lifting the upper body 236 to disengage respective latches. A latch mechanism 254 mounted on the upper frame 18 engages the support 242 to maintain the support 242 in a vertical position until the latch mechanism 254 is released. A handle 256 (best seen in FIG. 14) is actuated to allow the support 242 to be released relative to the upper frame 18. By lifting the upper body 236 and releasing the latch mechanism 254, the side rail 234 may be moved to the lowered position with the lower panel 238 rotating to tuck behind the upper body 236 in the lowered position. Gas spring dampers 258, 258 prevent the side rail 234 from slamming when lowered.

Figure 7:
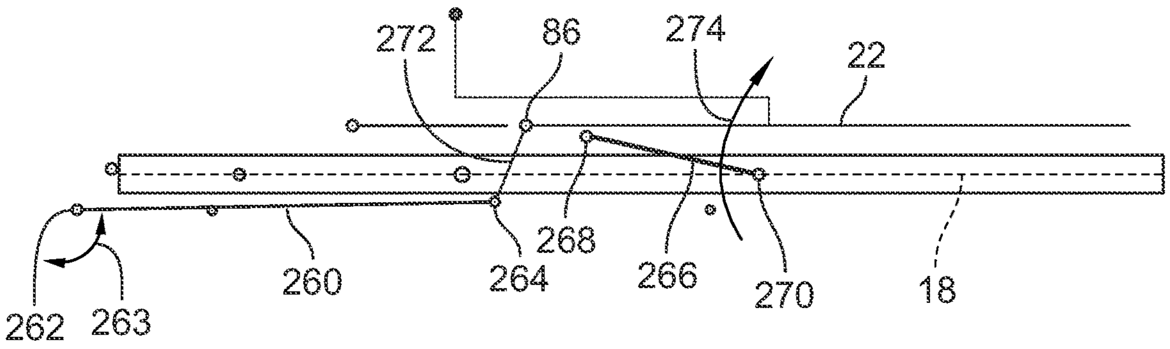
FIG. 7 is a kinematic diagram of a portion of the embodiment of FIGS. 3-6 showing the relationship of portions of the head deck in a lowered position.
Figure 8:
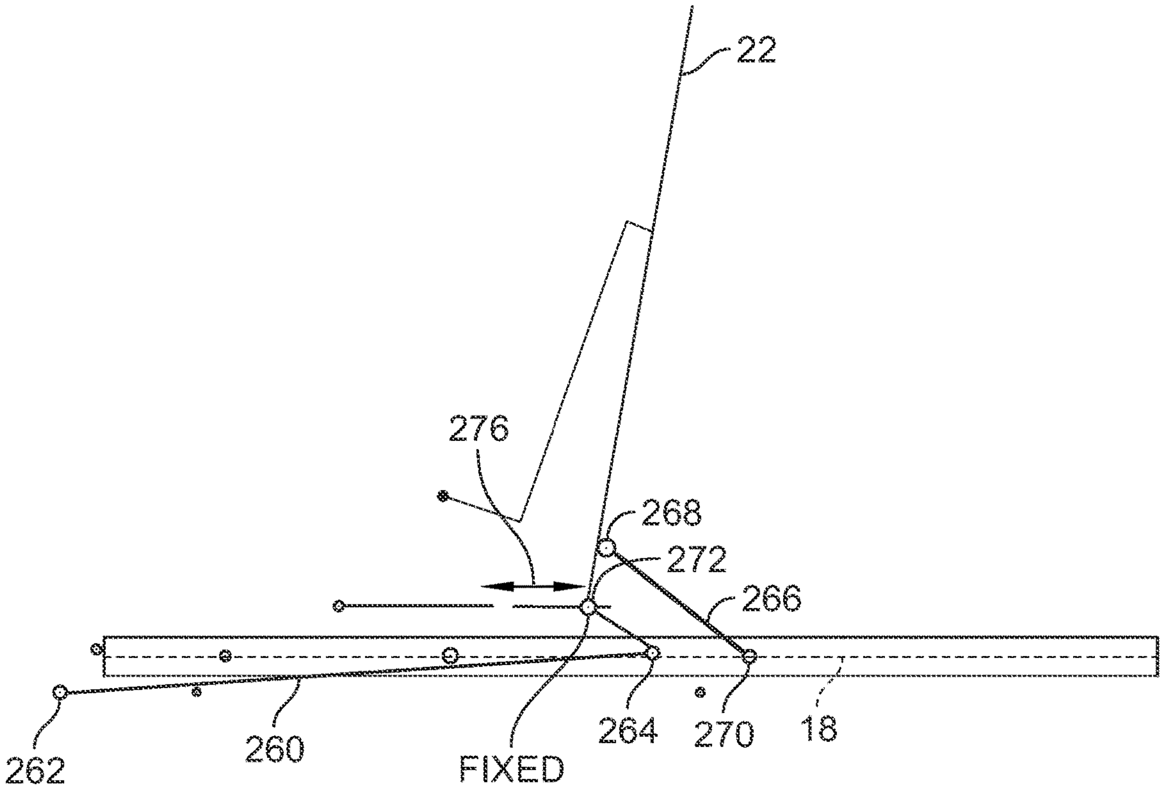
FIG. 8 is a kinematic diagram similar to FIG. 7 showing the relationship of portions of the head deck in a raised position.

Referring now to FIGS. 5, 7 and 8, the kinematic functionality of the movement of the head deck section 22 is shown with a lowered position shown in FIG. 7 and a raised position shown in FIG. 8. The head deck section 22 is moved by an electric actuator 260 which is pined to the upper frame 18 at a pivot 262, the actuator 260 pivotable about pivot 262 as indicated by the arrow 263. The actuator 260 is pivotably coupled to a crank arm 272 at a pivot 264. The crank arm 27 is fixed to the head deck section 22 and the two move together. The actuator 260 is pivotable relative to the crank arm 272 at the pivot 264. A compression link 266 is pivotably coupled to the upper frame 18 at a pivot 270 and pivotably coupled to the head deck section 22 at a pivot 268. The compression link 266 is shaped so that rotation of the compression link 266 as indicated by the arrow 274 causes the effective distance between pivots 268 and 270 to be reduced. In operation, the actuator 260 is extended and acts on the crank arm 272. The compression link 266 reacts to the movement to cause pivoting about the pivot 268 which effectively causes the crank arm 272 and head deck section 22 to pivot relative to the actuator 260, thereby raising the head deck section 22 as shown in FIG. 8. Notably, this causes the head deck section 22 to move in the direction of arrow 276, which is parallel to the upper frame 18. This motion mimics a sliding motion which tends to reduce the shear imparted on the back of a patient during the movement. Referring to FIG. 5, the linear motion of the head deck section 22 pivot 86 is constrained by movement of a sliding member 82 in a guide tube 84.

Figure 9:
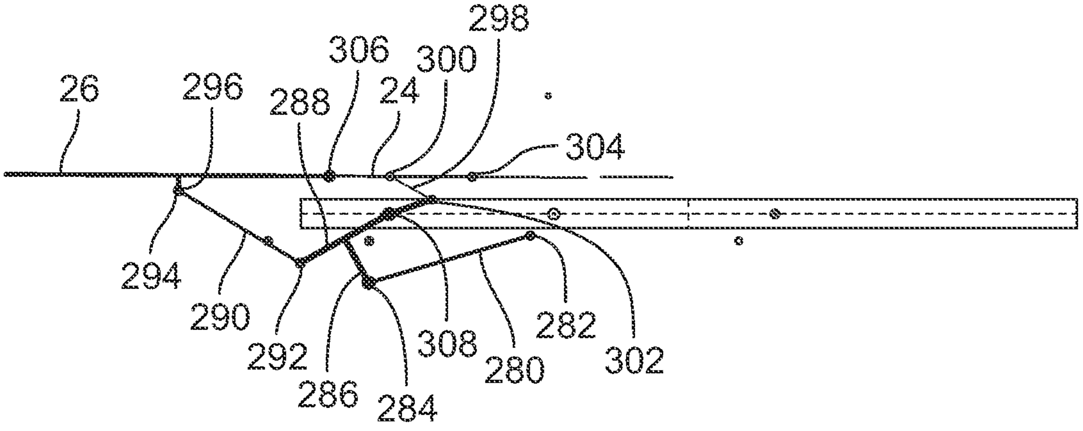
FIG. 9 is a kinematic diagram of a portion of the embodiment of FIGS. 3-6 showing the relationship of portions of the foot and thigh deck sections in a lowered position.
Figure 10:
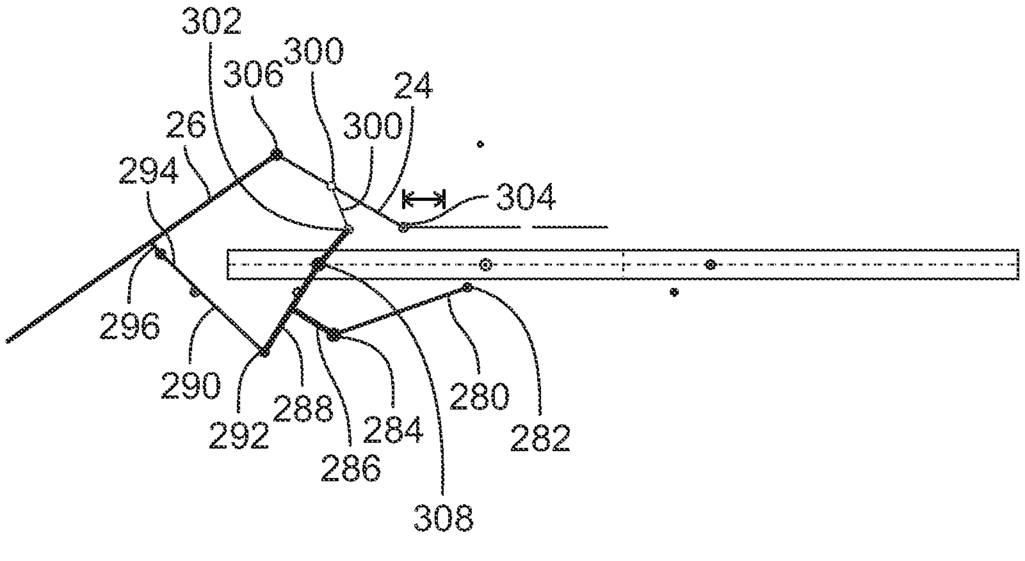
FIG. 10 is a kinematic diagram similar to FIG. 9 showing the relationship of portions of the foot and thigh deck sections in a raised position.

Referring now to FIGS. 5, 9 and 10, the kinematic functionality of the movement of the thigh deck section 24 and foot deck section 26 is illustrated. The movement of the thigh deck section 24 and foot deck section 26 is caused by an actuator 280 which is pivotably coupled to the upper frame 18 at a pivot 282. The actuator 280 is pivotably coupled to an arm 286 that is fixed to a swing link 288 and the two move together. The swing link 288 is pivotably coupled to a foot link 290 at a pivot 292. The foot link 290 is also pivotably coupled to an arm 296 fixed to the foot deck section 26 at a pivot 294. The swing link 288 is also pivotably coupled to a thigh link 298 at a pivot 302. The thigh link 300 is pivotably coupled to the thigh deck section 24 at a pivot 306. The thigh deck section 24 pivots relative to the upper frame 18 at a pivot 304 and the foot deck section 26 pivots relative to the thigh deck section 24 about a pivot 306.

The actuator 280 is extended to place the thigh deck section 24 and foot deck section 26 in a flat configuration as shown in FIG. 9. As the actuator 280 is retracted, the swing link 288 effectively rotates about a point 308 due to the kinematic constraints of the system of links. The link 298 acts on the thigh deck section 24, which, in turn, acts on the foot deck section 26 raising the pivot 306. However, the swing link 288 also acts on the foot link 290 causing the foot end 40 of the foot deck section 26 to be lowered. Effectively, the foot deck section 26 is placed in a dependent position where the foot end 40 is lower than the upper frame 18. This facilitates placing a patient in a chair position in the patient support apparatus 210.

Figure 11:
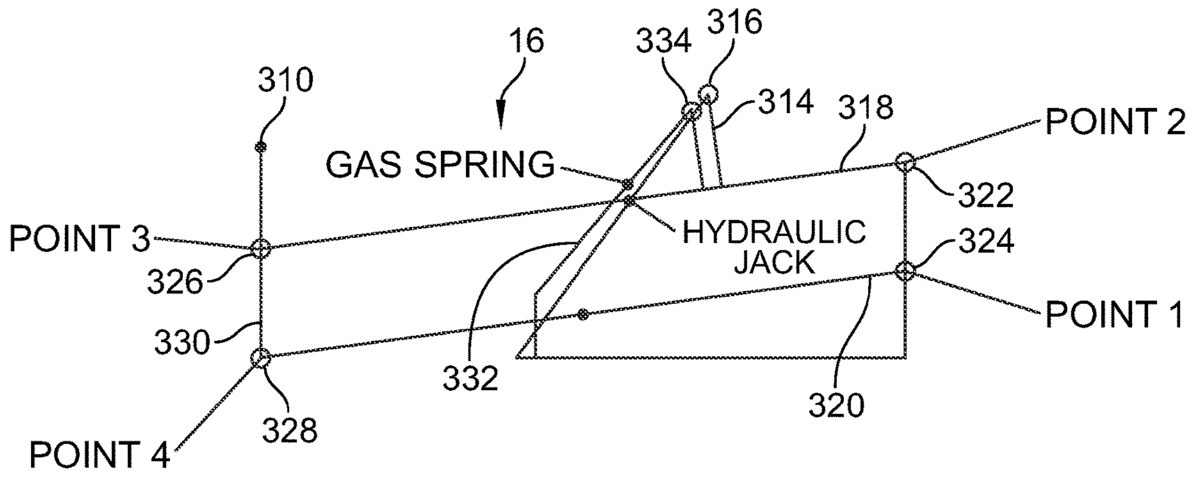
FIG. 11 is a kinematic diagram of a portion of the embodiment of FIGS. 3-6 showing the relationship of portions a lift system in a lowered position.
Figure 12:
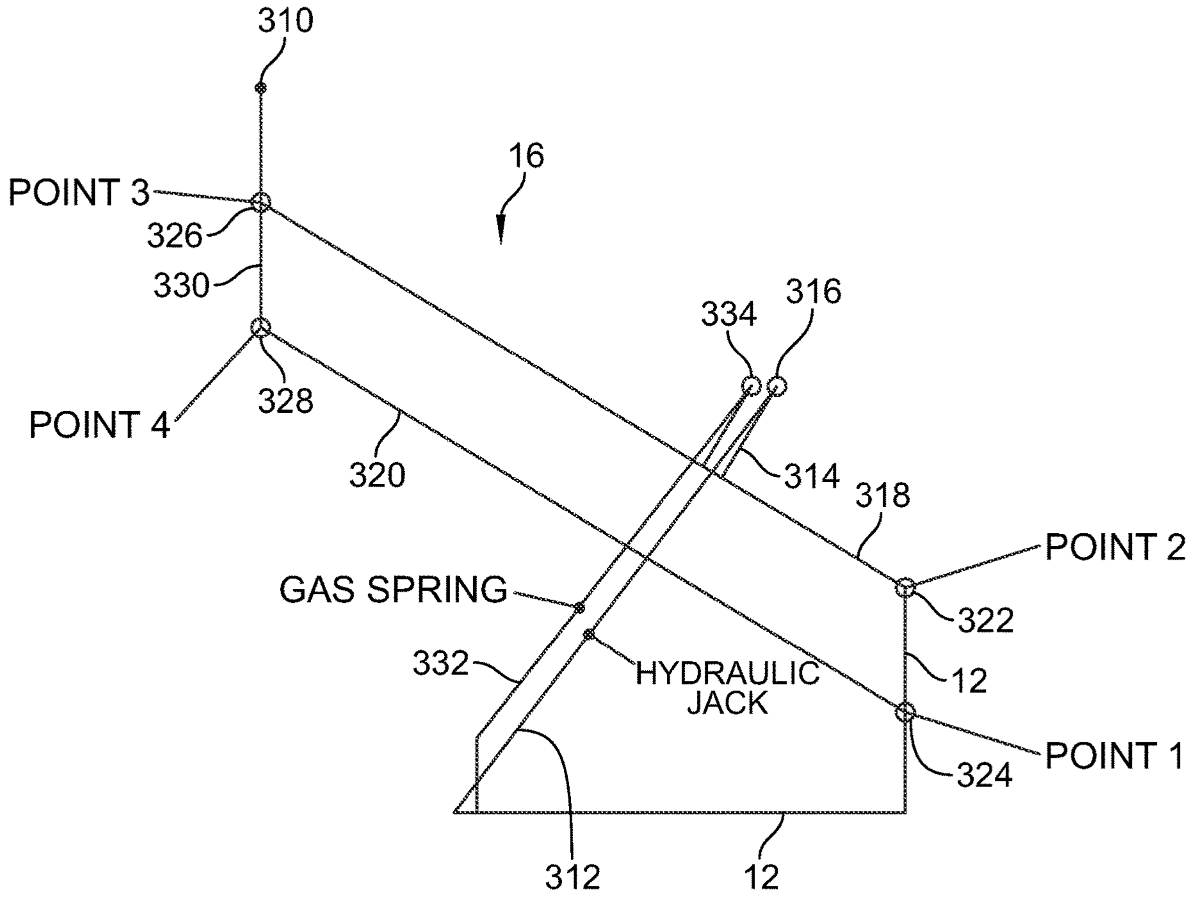
FIG. 12 is a kinematic diagram similar to FIG. 11 showing the relationship of portions of the lift system in a raised position.
Figure 13:
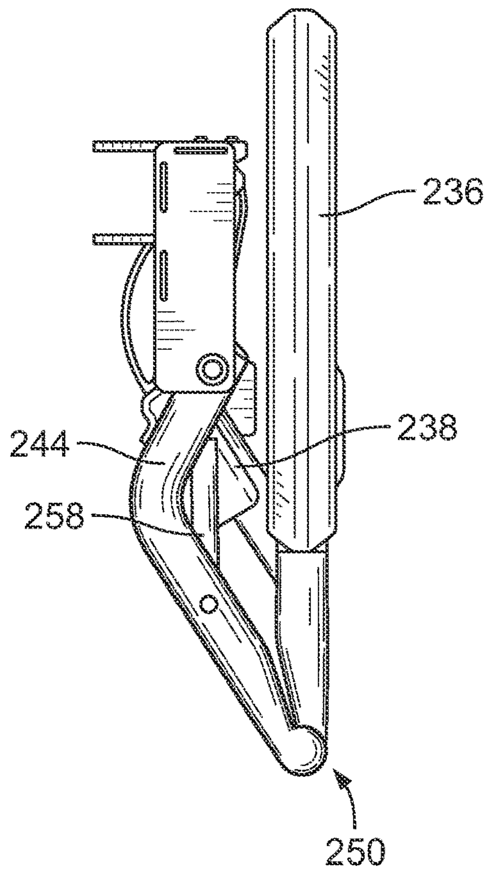
FIG. 13 is an end view of a left side rail of the third embodiment shown in a lowered position.

Referring now to FIGS. 11 and 12, the operation of the lift assembly 16 may be understood with reference to kinematic functionality of various links of the lift assembly 16. The lift assembly 16 supports the upper frame at a point 310 which is moved vertically by the lift assembly 16 which, in turn, is driven by a hydraulic cylinder/jack 312. The hydraulic cylinder 312 is pivotably coupled to an arm 314 which is secured to a link 318 so that the extension and retraction of the hydraulic cylinder 312 acts on the link 318. The link 318 is pivotably coupled to the base at a pivot 322. A second link 320 is pivotably coupled to the based 12 at a pivot 324. The links 318, 320 are each pivotably coupled to a connector 330 at pivots 326 and 328 respectively. The links 318, 320, base 12, and connector 330 form a parallelogram structure which controls movement of the point 310, and, thereby, the upper frame 18 in a generally vertical manner and with minimal swing, thereby limiting horizontal movement. In the embodiment shown in FIGS. 11 and 12, the lift assembly 16 includes a gas spring 332 placed in parallel to the hydraulic cylinder 312 and is pivotably coupled to the arm 314. In this way, the gas spring 332 provides a lift assist to the hydraulic cylinder 312 when the lift assembly 16 is lowered and at a mechanical disadvantage, as shown in FIG. 11. In other embodiments, the gas spring 332 may be omitted and replaced with a compression spring. In still other embodiments, a leaf spring may be used to act on the parallelogram structure of the lift assembly 16 to provide lift assist. In other embodiments, a torsional spring, or multiple torsional springs, may be applied to the pivots 322 and 324 to provide lift assist.

Figure 15:
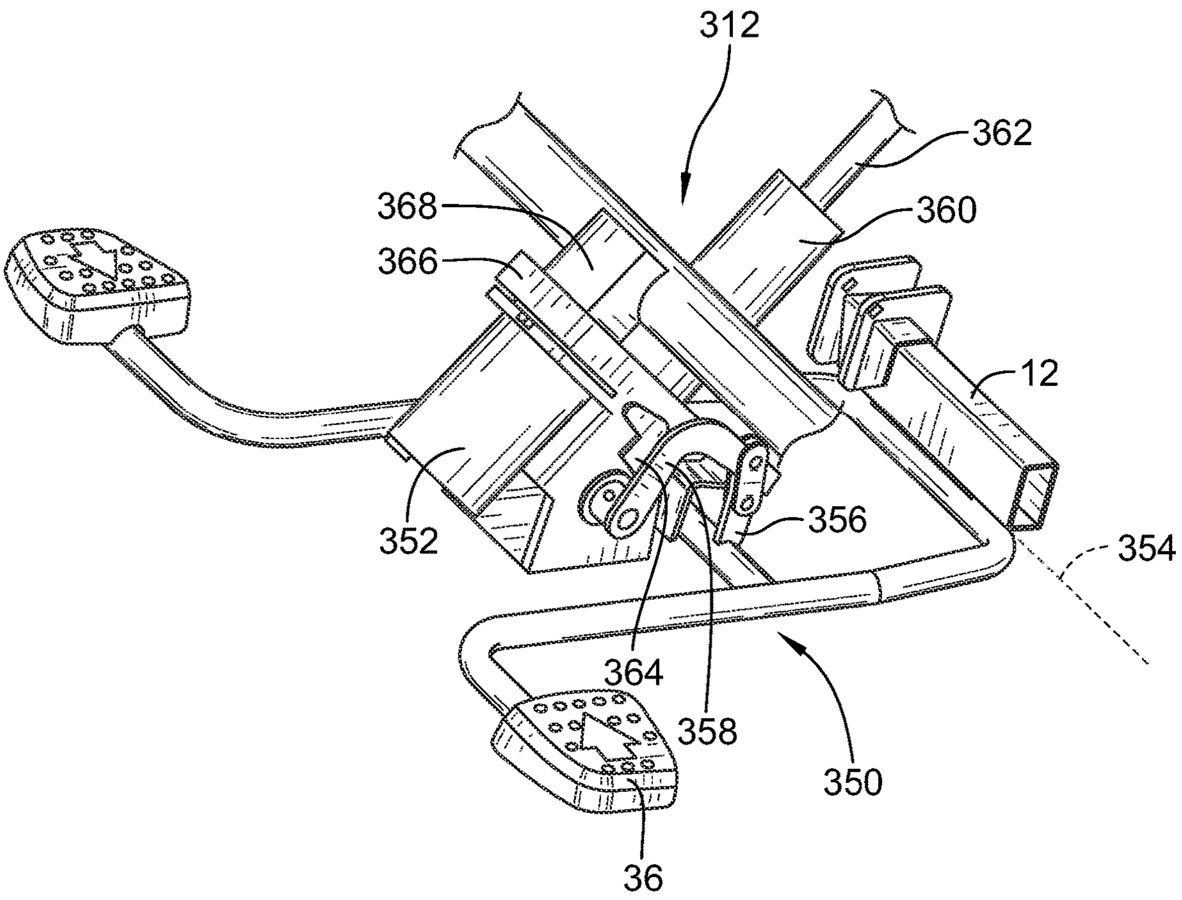
FIG. 15 is a perspective view of portions of the third embodiment showing a hydraulic system that is operable with both a foot pedal input and a motorized operation of a hydraulic pump.

Referring now to FIG. 15, the operation of the hydraulic cylinder 312 is effected by either a foot pedal assembly 350 or a motor 352. The foot pedal assembly 350 is connected to the foot pedal 36 and when a user depresses the pedal 36, the assembly rotates about an axis 354, causing a link 356 to act on a pump arm 358. The pump arm 358 moves hydraulic oil from a reservoir in to the cylinder body 360 and causes the cylinder rod 362 to extend. In the alternative, the motor 352 drives a hydraulic pump 368 which moves oil through a manifold 366 and into the cylinder body 360 to extend the cylinder rod 362. A release 364 is acted on by a cable assembly which may be activated by a user to release hydraulic oil from the cylinder body 360 to retract the rod 362. When the motor 352 is present, a user may actuate the motor 352 from the user interface 80. Similarly, an electric valve may be activated from the user interface 80 to retract the cylinder rod 362 and lower the lift assembly 16.

It should be understood that the actuators 260 and 280 and the hydraulic cylinder 312 may take various forms within the spirit of this disclosure. For example, the actuators 260 and 280 may be powered or unpowered. In embodiments, they may be electrically driven screw drive actuators or hydraulic cylinders. In other embodiments they may be releasable gas springs. The hydraulic cylinder 312 may be replaced with another telescopic structure, such as electrically driven screw drive actuator. When a releasable gas spring is used, the gas spring may provide support lift assist support.

Although this disclosure refers to specific embodiments, it will be understood by those skilled in the art that various changes in form and detail may be made without departing from the subject matter set forth in the accompanying claims.

The invention claimed is:

1. A patient support apparatus comprising an upper frame, a cantilevered lift system supporting the upper frame, the cantilevered lift system including a linkage configured to raise the upper frame in a substantially vertical direction, a telescopic cylinder engaged with the linkage, the telescopic extension and retraction of the cylinder causing the linkage to move, and a lift assist assembly, the lift assist assembly being loaded as the cantilevered lift system is lowered to impart a force on the linkage to reduce the load on the telescopic cylinder, a drive assembly operable to extend and retract the telescopic cylinder, the drive assembly including a manual module configured to allow a user to provide a manual input to the drive assembly to extend the telescopic cylinder and a powered module, the powered module removably coupleable to the manual module to allow the powered module to be added to the drive assembly to allow for powered extension of the telescopic cylinder.

2. The patient support apparatus of claim 1, wherein the lift assist assembly acts in parallel to the telescopic cylinder.

3. The patient support apparatus of claim 2, wherein the lift assist assembly comprises a compression spring.

4. The patient support apparatus of claim 2, wherein the lift assist assembly comprises a gas spring.

5. The patient support apparatus of claim 2, wherein the lift assist assembly comprises a torsion spring.

6. The patient support apparatus of claim 1, wherein the telescopic cylinder is a hydraulic cylinder.

7. The patient support apparatus of claim 1, wherein the manual input is a foot pedal.

8. The patient support apparatus of claim 1, wherein powered module comprises a motor and a pump driven by the motor.

9. The patient support apparatus of claim 1, further comprising a user interface and wherein the operation of the powered module is controlled by the user interface.

10. The patient support apparatus of claim 1, wherein the linkage comprises a parallelogram linkage.

11. The patient support apparatus of claim 1, wherein a free end of the cantilevered lift system is lower than a fixed end when the cantilevered lift system is in its lowest position.

12. A patient support apparatus comprising an upper frame, a thigh deck section pivotably coupled to the upper frame at a first pivot, a foot deck section pivotably coupled to the thigh section at a second pivot, the foot section having a free end, an actuator operable to move the thigh deck section and the foot deck section simultaneously, wherein retraction of the actuator causes the second pivot to rise vertically and the free end of the foot deck section to lower.

13. The patient support apparatus of claim 12, wherein the actuator is pivotably coupled to the upper frame.

14. The patient support apparatus of claim 13, wherein the actuator drives a foot link coupled to the foot deck section and a thigh link coupled to the thigh deck section.

15. The patient support apparatus of claim 14, wherein the foot link and the thigh link are interconnected by a swing link and the actuator acts on the swing link.

16. The patient support apparatus of claim 15, wherein the swing link is kinematically constrained such that it pivots about an imaginary axis.

17. The patient support apparatus of claim 14, wherein the thigh link is pivotably coupled to the thigh deck section and the foot link is pivotably coupled to the foot deck section.

18. The patient support apparatus of claim 17, wherein the foot link and the thigh link are interconnected by a swing link and the actuator acts on the swing link.

19. The patient support apparatus of claim 18, wherein the swing link is kinematically constrained such that it pivots about an imaginary axis.

20. The patient support apparatus of claim 19, wherein the foot link is pivotably coupled to the swing link and the thigh link is pivotably coupled to the swing link.

21. The patient support apparatus of claim 20, wherein the actuator is coupled to the swing link.

22. The patient support apparatus of claim 12, wherein the actuator drives a foot link coupled to the foot deck section and a thigh link coupled to the thigh deck section.

23. The patient support apparatus of claim 22, wherein the foot link and the thigh link are interconnected by a swing link and the actuator acts on the swing link.

24. The patient support apparatus of claim 23, wherein the swing link is kinematically constrained such that it pivots about an imaginary axis.

25. A patient support apparatus comprising an upper frame, a thigh deck section pivotably coupled to the upper frame at a first pivot, a foot deck section pivotably coupled to the thigh section at a second pivot, the foot section having a free end, a thigh link pivotably coupled to the thigh deck section, a foot link pivotably coupled to the foot deck section, a swing link pivotably coupled to the thigh link and pivotably coupled to the foot link, the swing link being kinematically constrained such that it pivots about an imaginary axis, an actuator pivotably coupled to the upper frame and pivotably coupled to the swing link, the actuator operable to move the thigh deck section and the foot deck section simultaneously, wherein movement of the actuator causes the second pivot to rise vertically and the free end of the foot deck section to lower, wherein retraction of the actuator causes the second pivot to raise and the free end of the foot deck section to lower.

* * * * *